(12) United States Patent
Kato et al.

(10) Patent No.: US 6,869,134 B2
(45) Date of Patent: Mar. 22, 2005

(54) COWL STRUCTURE FOR A VEHICLE

(75) Inventors: Masatoshi Kato, Kanagawa-ken (JP); Yasushi Murakami, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/356,499

(22) Filed: Feb. 3, 2003

(65) Prior Publication Data

US 2003/0178873 A1 Sep. 25, 2003

(30) Foreign Application Priority Data

Mar. 20, 2002 (JP) .................................... P2002-077863

(51) Int. Cl.[7] .......................... B62D 25/08; B60S 1/04
(52) U.S. Cl. .................. 296/192; 296/187.01
(58) Field of Search .......................... 296/192, 187.01, 296/208

(56) References Cited

U.S. PATENT DOCUMENTS

| | | | | |
|---|---|---|---|---|
| 4,935,983 A | * | 6/1990 | Yamamoto et al. | 15/250.16 |
| 4,938,526 A | * | 7/1990 | Sannomiya et al. | 296/192 |
| 4,943,102 A | | 7/1990 | Hamamoto et al. | |
| 6,193,304 B1 | * | 2/2001 | Takahashi et al. | 296/192 |
| 6,193,305 B1 | * | 2/2001 | Takahashi | 296/192 |

FOREIGN PATENT DOCUMENTS

| | | |
|---|---|---|
| DE | 3741172 A1 * | 6/1988 |
| EP | 0 916 559 A2 | 5/1999 |
| EP | 1 155 931 A2 | 11/2001 |
| EP | 1 219 513 A2 | 7/2002 |
| JP | 62-46616 | 12/1987 |
| JP | 63-22771 A * | 1/1988 |
| JP | 2-246880 | 10/1990 |
| JP | 4-125013 | 4/1992 |
| JP | 4-224475 | 8/1992 |
| JP | 5-461 | 1/1993 |
| JP | 8-1162 | 1/1996 |
| JP | 9-136664 | 5/1997 |
| JP | 2001-322562 | 11/2001 |

* cited by examiner

*Primary Examiner*—Patricia L. Engle
(74) *Attorney, Agent, or Firm*—McDermott Will & Emery LLP

(57) ABSTRACT

A cowl structure for a vehicle, which includes: a box-section cross member under a windshield of the vehicle; an extension member extending frontward from a base wall of the cross member; and a wiper bracket attached to a front wall of the cross member and the extension member. Either the base wall of the cross member or the extension member is provided with a rigidity changing part.

6 Claims, 8 Drawing Sheets

COWL STRUCTURE FOR A VEHICLE

BACKGROUND OF THE INVENTION

1. Field of the Invention

The present invention relates to a cowl structure for a vehicle, more particularly to a cowl structure with enhanced energy absorption for an impact load applied from above the vehicle.

2. Description of Related Art

Japanese Patent Application Laid-open No.2001-322562 discloses a cowl structure for a vehicle, in which a wiper pivot bracket is attached to a box-section cross member under a windshield, which is critical to rigidity of a vehicle body, especially torsional rigidity thereof.

SUMMARY OF THE INVENTION

In the above cowl structure, however, the bracket is attached only to a front vertical wall of the box-section cross member. Therefore, entire loads applied to the bracket are received by the front vertical wall.

When a large impact load is applied from above to an area near the wiper pivot, the front vertical wall resists the load, reducing the energy absorption of the structure.

An object of the present invention is to provide a cowl structure for a vehicle with enhanced energy absorption for an impact load applied from above the vehicle without impairing rigidity of a vehicle body.

An aspect of the present invention is a cowl structure for a vehicle, comprising: a box-section cross member under a windshield of the vehicle; an extension member extending frontward from a base wall of the cross member; and a wiper bracket attached to a front wall of the cross member and the extension member, wherein either the base wall of the cross member or the extension member is provided with a rigidity changing part.

BRIEF DESCRIPTION OF THE DRAWINGS

The invention will now be described with reference to the accompanying drawings wherein.

DETAILED DESCRIPTION OF THE PREFERRED EMBODIMENT

Figure 1A:
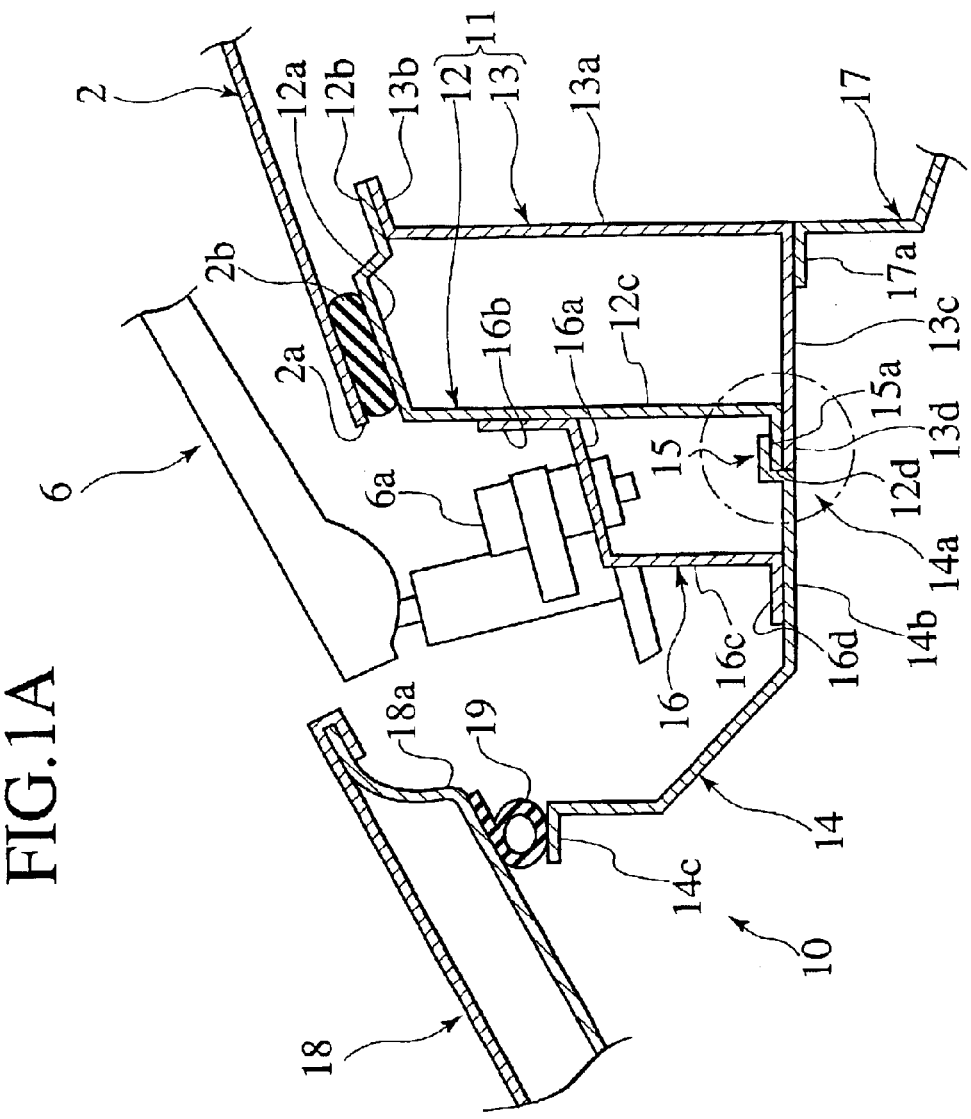
FIG. 1A is a sectional view of a cowl structure for a vehicle according to a first embodiment of the present invention, taken along I—I line in FIG. 2.

Embodiments of the present invention will be explained below with reference to the drawings, wherein like members are designated by like reference characters.

In a cowl structure of a vehicle according to a first embodiment, as shown in FIGS. 1A through 3, an air-box 11 (box-section cross member) having a substantially box-shaped cross-section is extending in a vehicle transverse direction along a lower edge 2a of a windshield 2 of a vehicle 10.

The air-box 11 is constituted mainly of a cowl top upper panel 12 and a cowl top inner panel 13.

The cowl top upper panel 12 of the air-box 11 is formed to have, on its upper side, an upper wall 12a extending substantially parallel to the windshield 2 to support the windshield 2 from below, a butting against a lower edge 2a thereof, via a seal member 2b interposed therebetween, and a front vertical wall 12c extending downward from a front edge of the upper wall 12a.

The cowl top inner panel 13 is formed to have, on its rear side, a rear-side vertical wall 13a, and a base wall 13c extending frontward from a lower edge of the rear-side vertical wall 13a.

The upper wall 12a of the cowl top upper panel 12 is formed to have, at its rear edge, a rear end flange 12b extending rearward to be connected to an upper end flange 13b provided at an upper edge of the rear-side vertical wall 13a of the cowl top inner panel 13.

The front vertical wall 12c of the cowl top upper panel 12 is formed to have, at its lower end, a flange 12d extending frontward to be joined to a front edge portion 13d of the base wall 13c of the cowl top inner panel 13.

An extension cowl top member 14 constituted by a different member from the base wall 13c of the cowl top inner panel 13, extends frontward from the base wall 13c thereof, with its rear edge portion 14a connected to the air-box 11, specifically to an area where the flange 12d of the cowl top upper panel 12 and the front edge portion 13d of the base wall 13c of the cowl top inner panel 13 are joined.

The extension cowl top member 14 is formed to have a substantially horizontal wall 14b extending frontward, and at the rear edge portion 14a of the horizontal wall 14b, a step portion 15 formed by bending upward the rear edge portion 14a thereof, which serves as a rigidity changing part.

The step portion 15 is joined from above to the air-box 11, specifically to an area where the flange 12d of the cowl top upper panel 12 and the front edge portion 13d of the cowl top inner panel 13 are joined, with its bottom face 15a attached to a top face of the flange 12d, so that the horizontal wall 14b of the extension cowl top member 14 and the base wall 13c of the air-box 11 can be flush with each other at their bottom.

From a rear edge portion of the base wall 13c of the cowl top inner panel 13 of the air-box 11, a dash lower panel 17 is extending downward. The dash lower panel 17 is formed to have, at its top edge, a flange 17a extending frontward to be joined to the read edge portion of the base wall 13c, so that the rear-side vertical wall 13a of the cowl top inner panel 13 and the dash lower panel 17 can be flush with each other at their rear side.

Additionally, a front part of the horizontal wall 14b of the extension cowl top member 14 is bent upward and formed to have, at its front and top end, a flange 14c extending substantially horizontally frontward, which is abutted against an underside of a rear edge portion 18a of an engine compartment hood 18 with a hood seal member 19 interposed therebetween.

In front of the air-box 11 of the first embodiment, a wiper bracket 16 is provided to rotatably support a pivot shaft 6a of a windshield wiper 6.

The wiper bracket 16 is formed to have, on its upper side, a mounting top 16a to which the pivot shaft 6a is mounted, and, at a rear edge of the mounting top 16a, a rear-side flange 16b extending upward therefrom to be connected to a front face of the front vertical wall 12c of the air-box 11. At a front edge of the mounting top 16a, a front vertical wall 16c is integrally formed to extend downward, and, from a lower edge of the front vertical wall 16c, a leg flange 16d extending frontward is integrally formed by bending to be connected to an upper face of the horizontal wall 14b of the extension cowl top member 14.

The wiper bracket 16 is thus fixed, in a bridging manner as shown in FIG. 1, to both the front vertical wall 12c of the air-box 11 and the horizontal wall 14b of the extension cowl top member 14.

Next, description will be made regarding a function of the first embodiment.

In the cowl structure of the first embodiment, the wiper bracket 16 is fixed, in a bridging manner, to both the front vertical wall 12c of the air-box 11 and the horizontal wall 14b of the extension cowl top member 14 extending frontward from the base wall 13c of the air-box 11, and the step portion 15 of the extension cowl top member 14 as a rigidity changing part is provided between a point where the front vertical wall 16c of the wiper bracket 16 meets the horizontal wall 14b of the extension cowl top member 14 and a point where the front vertical wall 12c of the air-box 11 meets the base wall 13c thereof.

Figure 3:
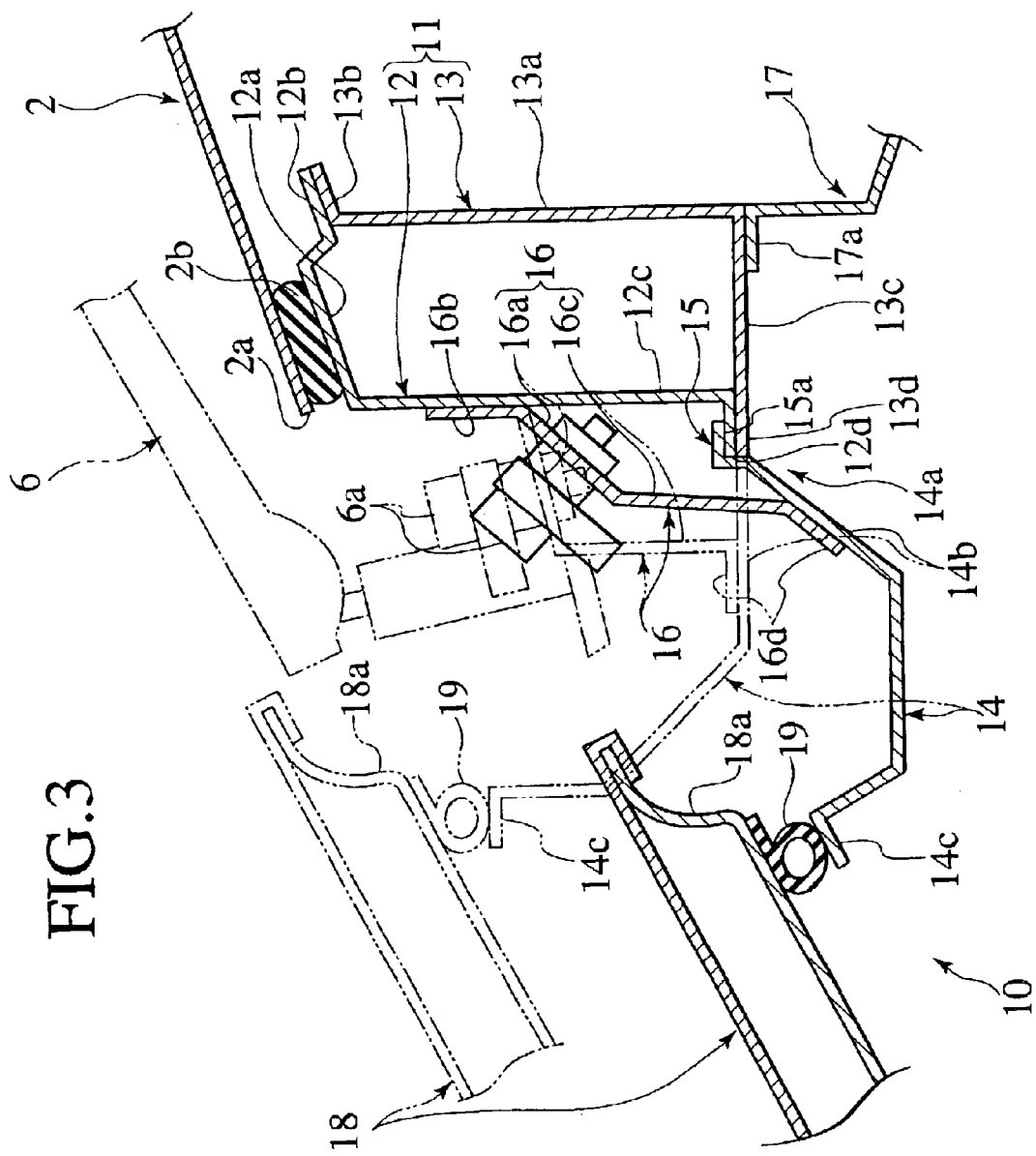
FIG. 3 is a sectional view of the cowl structure for the vehicle of FIG. 1A, showing a state where an impact load has been applied from above.

Therefore, as impact loads are applied from above the vehicle to the wiper bracket 16, stress concentrates to the step portion 15 of the extension cowl top member 14, causing the wiper bracket 16 and the extension cowl top member 14 in front of the rigidity changing part to sag down, as shown in solid lines in FIG. 3, whereby the impact load energy is absorbed.

The energy absorption efficiency for the impact load applied from above the vehicle will be enhanced, without impairing the rigidity of the vehicle body.

Additionally, the extension cowl top member 14 is joined to the air-box 11 which is made of a different member from the extension cowl top member 14, with the bottom face 15a of the step portion 15 at the rear edge thereof attached to the top face of the flange 12d which extends frontward from the lower end of the front vertical wall 12c of the air-box 11 and is jointed to the front edge portion 13d of the base wall 13c of the air-box 11. Therefore, the impact loads applied from above the vehicle to the wiper bracket 16 are transmitted through the front vertical wall 16c and the front leg flange 16d of the wiper bracket 16 to the horizontal wall 14b of the extension cowl top member 14, not directly to the air-box 11, whereby the air-box 11 does not resist the loads.

Members constituting the closed cross-section of the air-box 11, such as the cowl top upper panel 12 and the cowl top inner panel 13, will not change their shape, and thus the rigidity of the vehicle body will be kept.

The energy absorption efficiency for the impact loads applied from above the vehicle will be improved, without impairing the rigidity of the vehicle body.

Figure 1B:
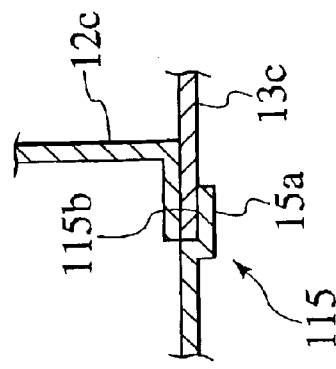
FIGS. 1B and 1C are enlarged sectional views of the cowl structure for the vehicle of FIG. 1A, showing examples of a rigidity changing part in an area circled in FIG. 1A.

In the cowl structure of the present embodiment, the step portion 15 on the extension cowl top member 14 is bent upward. However, as shown in FIG. 1B, the same effects can be obtained by a step portion 115 formed by bending downward the rear edge portion 14a of the horizontal wall 14b of the extension cowl top member 14. The step portion 115, as a rigidity changing part, is joined from below to the air-box 11, specifically to an area where the flange 12d of the cowl top upper panel 12 and the front edge portion 13d of the cowl top inner panel 13 are joined, with its top face 115b attached to a bottom face of the front edge portion 13d, so that the horizontal wall 14b of the extension cowl top member 14 and the base wall 13c of the air-box 11 can be in line with each other.

Figure 1C:
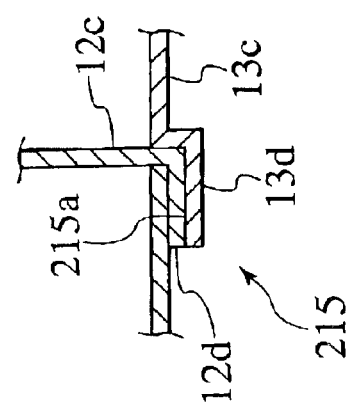
Figure 2:
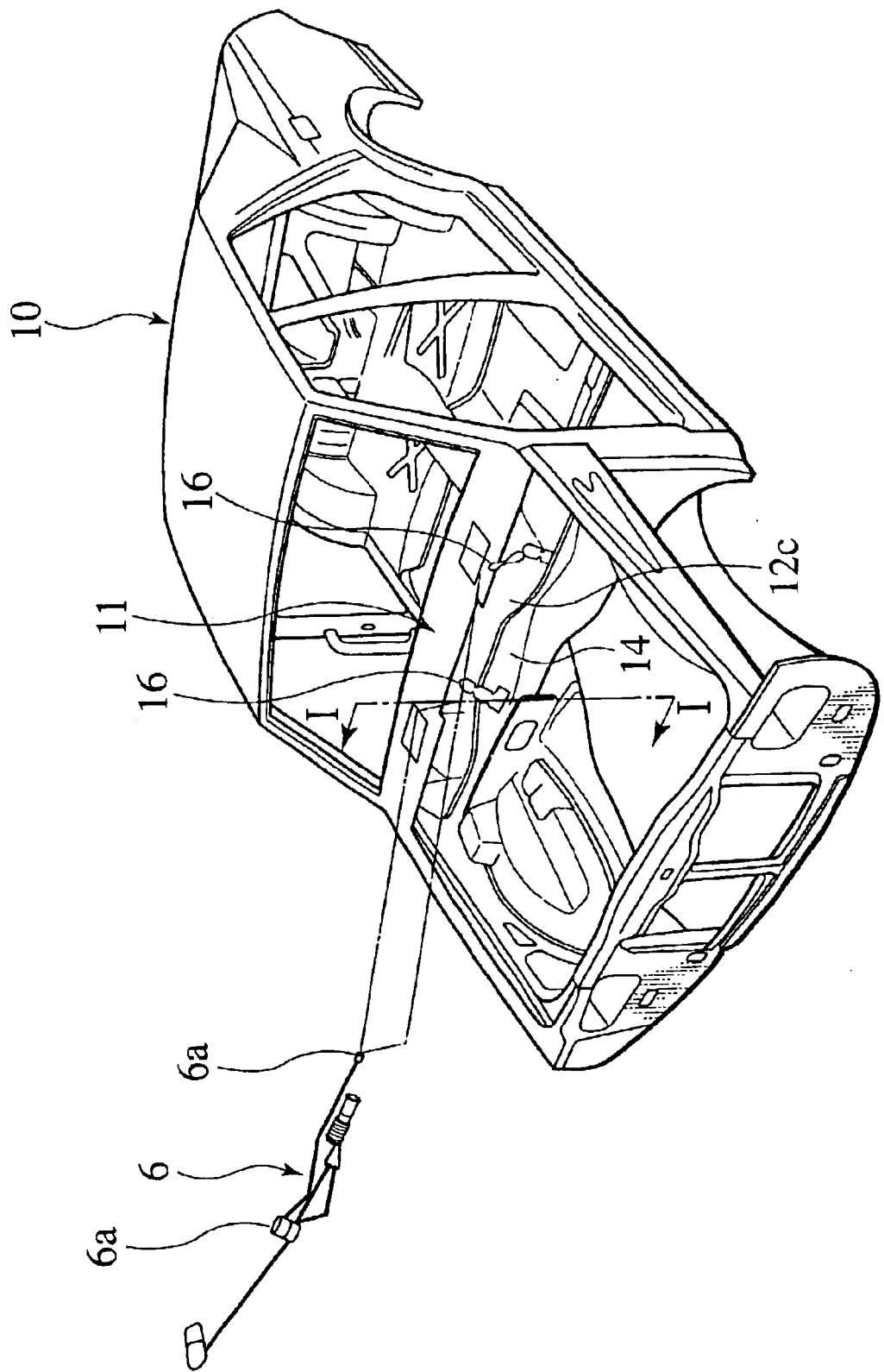
FIG. 2 is an exploded perspective view of the cowl structure for the vehicle of FIG. 1A.

Furthermore, as shown in FIG. 1C, the same effects can be obtained by a step portion 215 formed by bending downward the front edge portion 13d of the base wall 13c of the cowl top inner panel 13 of the air-box 11. The step portion 215, as a rigidity changing part, is joined from below to the flange 12d of the cowl top upper panel 12, with its top face 215a of the step portion 215 attached to a bottom face of the flange 12d. The extension cowl top member 14 without a step portion is joined to the air-box 11, specifically to the area where the flange 12d of the cowl top upper panel 12 and the step portion 215 of the cowl top inner panel 13 are joined, with its bottom face of a straight rear edge portion of the extension cowl top member 14 attached to atop face of the flange 12d, so that the horizontal wall 14b of the extension cowl top member 14 and the base wall 13c of the air-box 11 can be in line with each other.

Next, description will be made regarding a second embodiment of the present invention.

Figure 4:
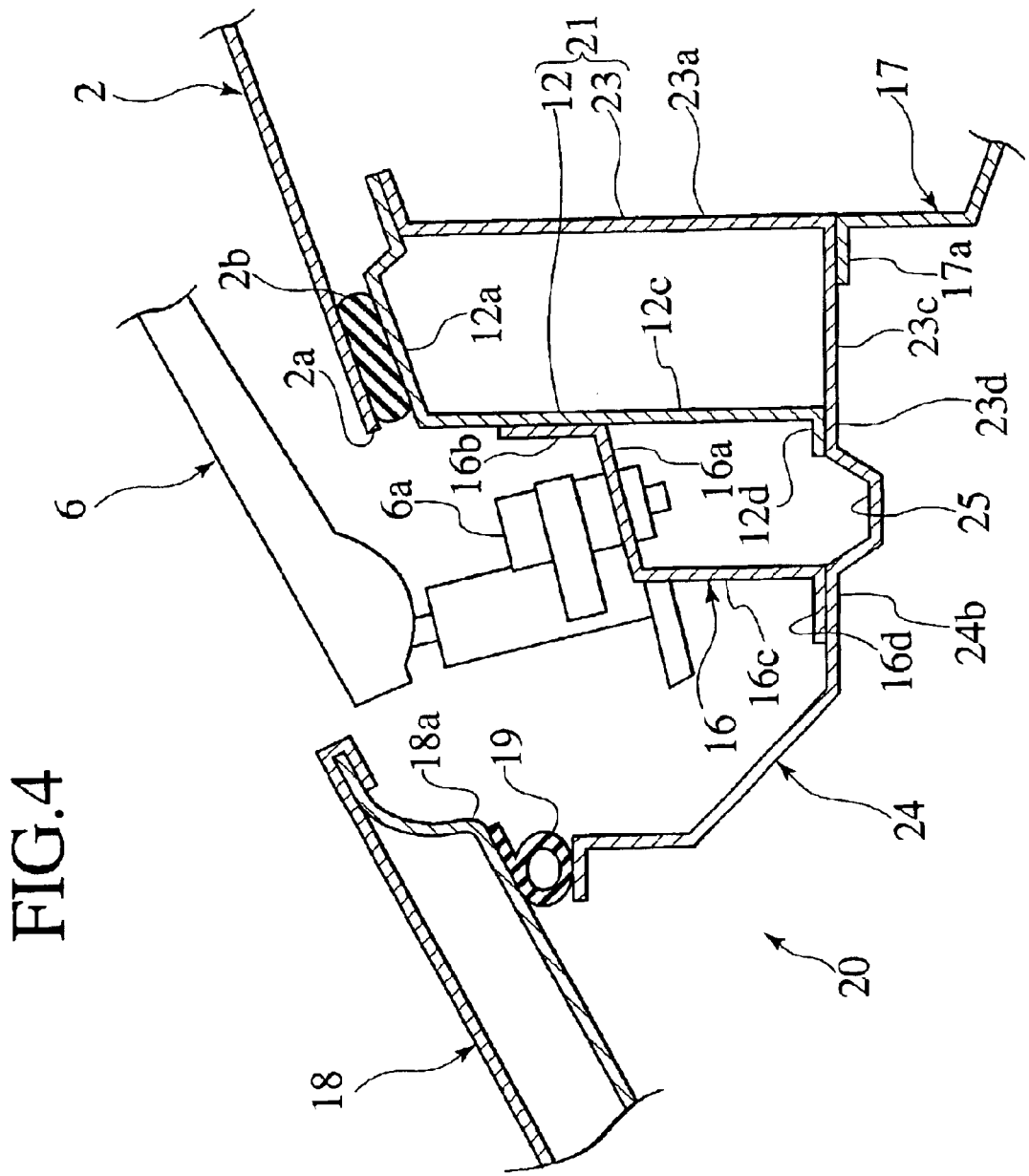
FIG. 4 is a sectional view of a cowl structure for a vehicle according to a second embodiment of the present invention, showing an area corresponding to FIG. 1A.
Figure 5:
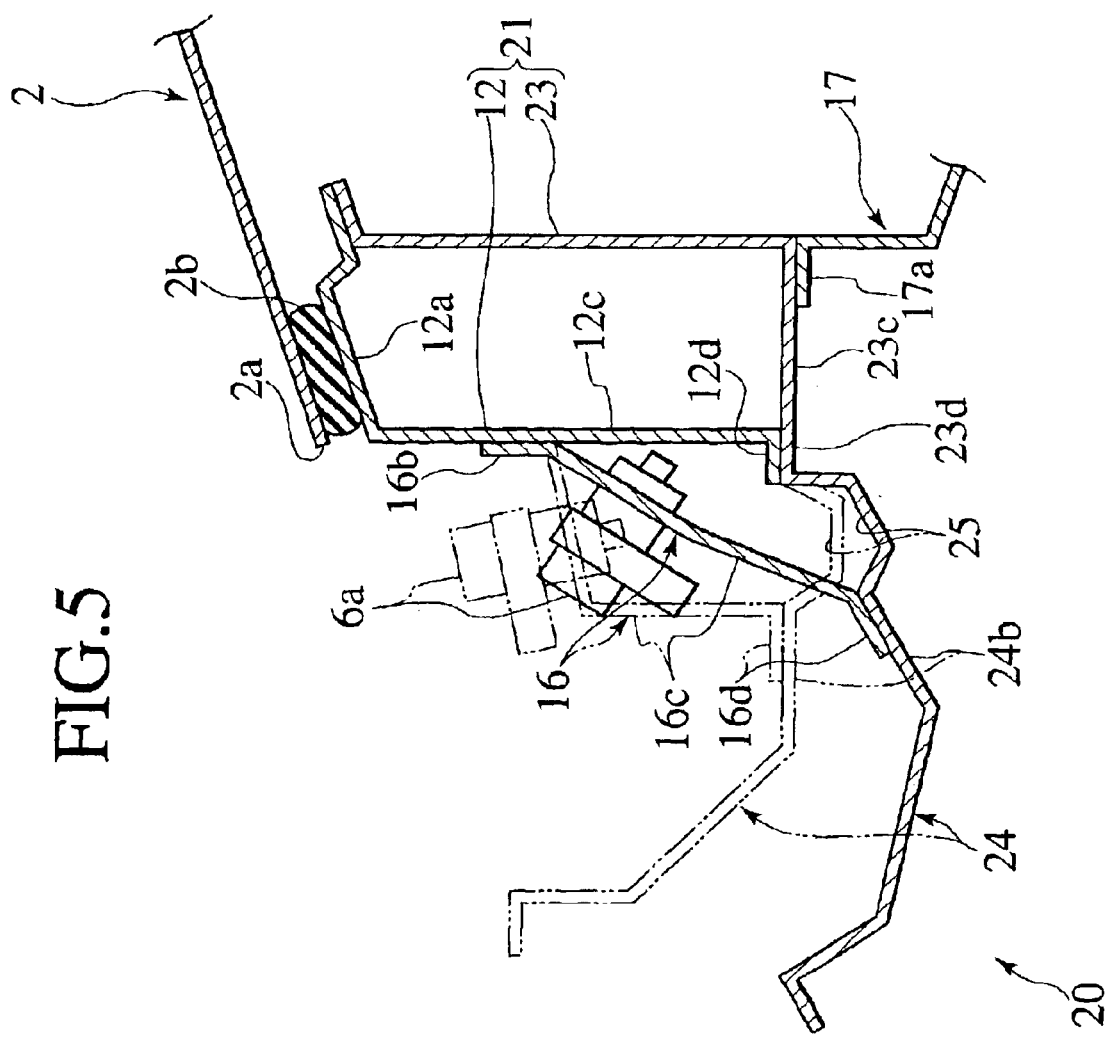
FIG. 5 is a sectional view of the cowl structure for the vehicle of FIG. 4, showing a state where an impact load has been applied from above the vehicle.

In a cowl structure of a vehicle according to the second embodiment, as shown in FIGS. 4 and 5, an air-box 21 (box-section cross member) having a substantially box-shaped cross-section is extending in a vehicle transverse direction along a lower edge 2a of a windshield 2 of a vehicle 20.

The air-box 21 is constituted mainly of a cowl top upper panel 12 and a cowl top inner panel 23.

The cowl top inner panel 23 is formed to have, on its rear side, a rear-side vertical wall 23a, and abase wall 23c extending frontward from a lower edge of the rear-side vertical wall 23a.

The cowl top upper panel 12 is formed to have, on its front side, a front vertical wall 12c, and at a lower edge of the front vertical wall 12c, a flange 12d extending frontward therefrom, to be connected to the base wall 23c of the cowl top inner panel 23.

In the cowl structure of the second embodiment, an extension cowl top member 24 extending frontward from a joint point 23d of the base wall 23c, where the flange 12d of the front vertical wall 12c of the cowl top upper panel 12 is joined to the base wall 23c, is formed integrally with the base wall 23c of the cowl top inner panel 23.

Furthermore, the extension cowl top member 24 is formed to have, between the joint point 23d of the base wall 23c or the extension cowl top member 24 and a joint point where the front leg flange 16d of the wiper bracket 16 is joined to a horizontal wall 24b of the extension cowl top member 24, a concave groove (channel) 25 as a rigidity changing part extending in the vehicle transverse direction.

Next, description will be made regarding a function of the second embodiment.

In the cowl structure of the second embodiment, the wiper bracket 16 is fixed, in a bridging manner, to both the front vertical wall 12c of the air-box 21 and the horizontal wall 24b of the extension cowl top member 24 integrally extending frontward from the base wall 23c of the air-box 21.

The concave groove 25 of the extension cowl top member 24 as a rigidity changing part is provided between a point where the front vertical wall 16c of the wiper bracket 16 meets the horizontal wall 24b of the extension cowl top member 24 and a point where the front vertical wall 12c of the air-box 21 meets the base wall 23c thereof.

Therefore, as impact loads are applied from above the vehicle to the wiper bracket 16, stress concentrates to the concave groove 25 of the extension cowl top member 24, causing the wiper bracket 16 and the extension cowl top member 24 in front of the rigidity changing part to sag down, as shown in solid lines in FIG. 5, whereby the impact load energy is absorbed.

The energy absorption efficiency for the impact load applied from above the vehicle will be enhanced, without impairing the rigidity of the vehicle body.

Furthermore, in the second embodiment, the extension cowl top member 24 is formed integrally with the base wall 23c of the cowl top inner panel 23 of the air-box 21 to extend frontward from the joint point 23d.

Therefore, the number of parts can be decreased, contributing to manufacturing cost saving.

Next, description will be made regarding a third embodiment of the present invention.

Figure 6:
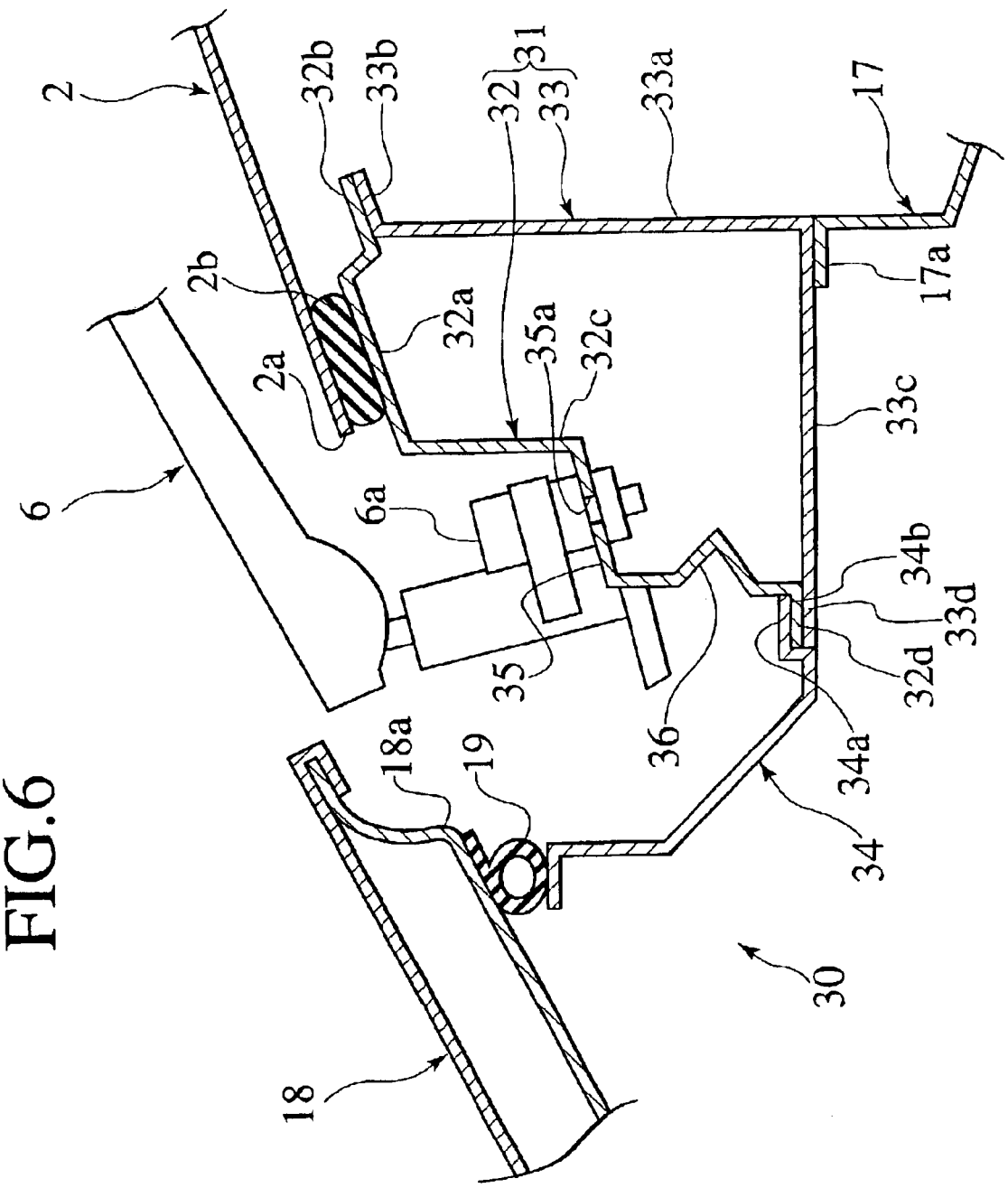
FIG. 6 is a sectional view of a cowl structure for a vehicle according to a third embodiment of the present invention, showing an area corresponding to FIG. 1A.

In a cowl structure of a vehicle according to the third embodiment, as shown in FIG. 6, an air-box 31 (box-section cross member) having a substantially box-shaped cross-section is extending in a vehicle transverse direction along a lower edge 2a of a windshield 2 of a vehicle 30.

The air-box 31 is constituted mainly of a cowl top upper panel 32 and a cowl top inner panel 33.

The cowl top upper panel 32 of the air-box 31 is formed to have, on its upper side, an upper wall 32a extending substantially parallel to the windshield 2 to support the windshield 2 from below, abutting against a lower edge 2a thereof, via a seal member 2b interposed therebetween, and a front vertical wall 32c extending downward from a front edge of the upper wall 32a.

The front vertical wall 32c is formed to have a substantially horizontal platform portion 35 to support a windshield wiper 6. The platform portion 35 is provided with an attachment hole 35a through which a pivot shaft 6a of the windshield wiper 6 is inserted.

The cowl top inner panel 33 is formed to have, on its rear side, a rear-side vertical wall 33a, and a base wall 33c extending frontward from a lower edge of the rear-side vertical wall 33a.

The upper wall 32a of the cowl top upper panel 32 is formed to have, at its rear edge, a rear end flange 32b extending rearward to be connected to an upper end flange 33b provided at an upper edge of the rear-side vertical wall 33a of the cowl top inner panel 33.

Furthermore, in the third embodiment, the front vertical wall 32c is formed to have, below the platform portion 35, a V-shaped groove (V-shaped channel) 36 as a rigidity changing part extending in the vehicle transverse direction. The V-shaped groove 36 is formed to be open frontward and convex rearward.

In the third embodiment, the base wall 33c of the air-box 31 and an extension cowl top member 34 extending frontward from the base wall 33c are made of two different members.

The front vertical wall 32c is also formed to have, at its lower edge, a flange 32d extending frontward therefrom. The extension cowl top member 34 is formed to have, at its rear edge portion, a step portion 34a formed by bending upward the rear edge portion. The extension cowl top member 34 is connected to the air-box 31, specifically to an area where the flange 32d of the cowl top upper panel 32 and a front edge portion 33d of the base wall 33c of the cowl top inner panel 33 are joined together, with a bottom face 34b of the step portion 34a attached to the top face of the flange 32d.

Next, description will be made regarding a function of the third embodiment.

In the third embodiment, the transversely extending V-shaped groove 36 is formed to be convex rearward below the platform portion 35, as a rigidity changing part.

Therefore, as impact loads are applied from above the vehicle to the front vertical wall 32c through the windshield wiper 6 and the platform portion 35, stress concentrates to the V-groove 36, causing the front vertical wall 32c to collapse in a vertical direction with the platform portion 35 sagging down, whereby the impact load energy is absorbed.

The energy absorption efficiency for the impact load applied from above will be enhanced, without impairing the rigidity of the vehicle body in transverse and torsional directions.

In addition, in the third embodiment, the substantially horizontal platform portion 35 to support the windshield wiper 6 is formed on the front vertical wall 32c, and on the platform portion 35, the attachment hole 35a is provided, through which the pivot shaft 6a of the windshield wiper 6 is inserted.

Therefore, parts for supporting the windshield wiper 6, such as the wiper bracket 16, can be eliminated.

Decrease in number of parts will reduce weight and manufacturing cost.

Next, description will be made regarding a fourth embodiment of the present invention.

Figure 7:
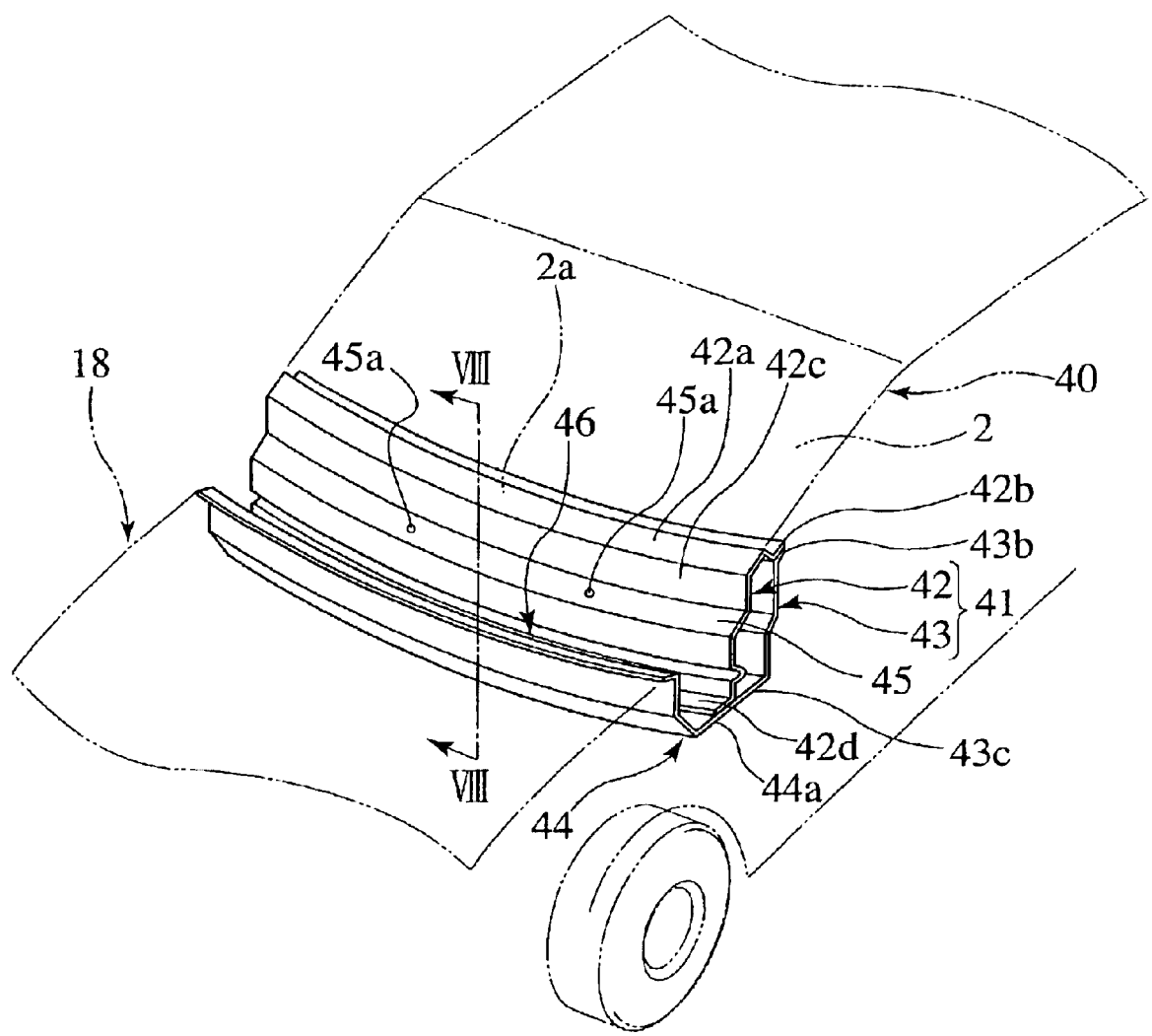
FIG. 7 is a translucent perspective view of a cowl structure for a vehicle according to a fourth embodiment of the present invention.
Figure 8:
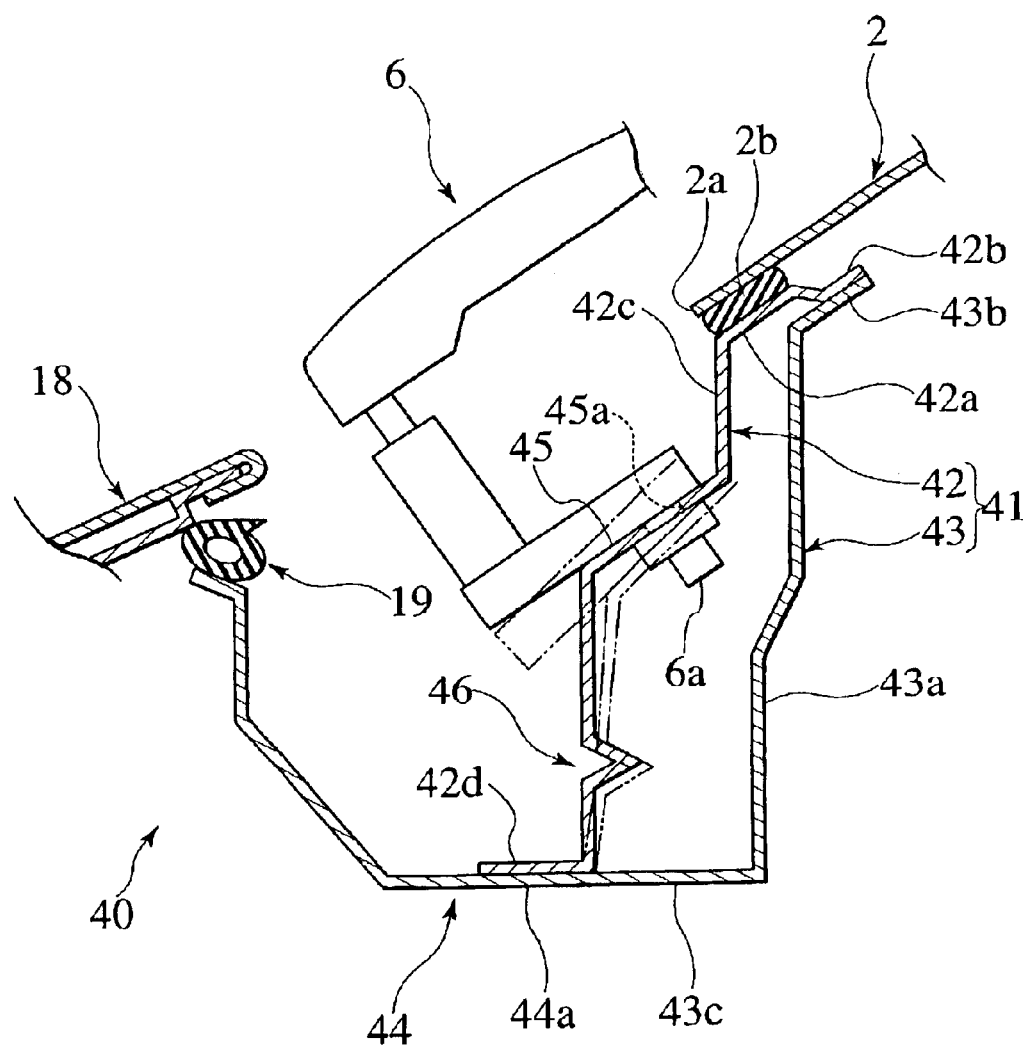
FIG. 8 is a sectional view of the cowl structure for the vehicle of FIG. 7, taken along VIII—VIII line in FIG. 7, showing an area corresponding to FIG. 1A.

In a cowl structure of a vehicle according to the fourth embodiment, as shown in FIGS. 7 and 8, an air-box 41 (box-section cross member) having a substantially box-shaped cross-section is extending in a vehicle transverse direction along a lower edge 2a of a windshield 2 of a vehicle 40.

The air-box 41 is constituted mainly of a cowl top upper panel 42 and a cowl top inner panel 43.

The cowl top upper panel 42 of the air-box 41 is formed to have, on its upper side, an upper wall 42a extending substantially parallel to the windshield 2 to support the windshield 2 from below, abutting against a lower edge 2a thereof, via a seal member 2b interposed therebetween, and a front vertical wall 42c extending downward from a front edge of the upper wall 42a.

The cowl top inner panel 43 is formed to have, on its rear side, a rear-side vertical wall 43a, and a base wall 43c extending frontward from a lower edge of the rear-side vertical wall 43a.

The upper wall 42a of the cowl top upper panel 42 is formed to have, at its rear edge, a rear end flange 42b extending rearward to be connected to an upper end flange 43b provided at an upper edge of the rear-side vertical wall 43a of the cowl top inner panel 43.

The front vertical wall 42c is formed to have a substantially horizontal platform portion 45 to support a windshield wiper 6. The platform portion 45 is provided with an attachment hole 45*a* through which a pivot shaft 6*a* of the windshield wiper 6 is inserted.

Furthermore, in the fourth embodiment, the front vertical wall 42*c* is formed to have, below the platform portion 45, a V-shaped groove (V-shaped channel) 46 as a rigidity changing part extending in the vehicle transverse direction. The V-shaped groove 46 is formed to be open frontward and convex rearward.

In the fourth embodiment, the expansion cowl top member 44 is formed integrally with the base wall 43*c* of the air-box 41 to extend frontward therefrom.

The front vertical wall 42*c* is formed to have, at its lower edge, a flange 42*d* extending frontward, which is connected to a horizontal wall 44*a* of the extension cowl top member 44.

Next, description will be made regarding a function of the fourth embodiment.

In the fourth embodiment, the transversely extending V-shaped groove 46 is formed to be convex rearward below the platform portion 45, as a rigidity changing part.

Therefore, as impact loads are applied from above the vehicle to the front vertical wall 42*c* through the windshield wiper 6 and the platform portion 45, stress concentrates to the V-groove 46, causing the front vertical wall 42*c* to collapse in a vertical direction with the platform portion 45 sagging down, whereby the impact load energy is absorbed.

The energy absorption efficiency for the impact load applied from above will be enhanced, without impairing the rigidity of the vehicle body in transverse and torsional directions.

In addition, in the fourth embodiment, the substantially horizontal platform portion 45 to support the windshield wiper 6 is formed on the front vertical wall 42*c*, and on the platform portion 45, the attachment hole 45*a* is provided, through which the pivot shaft 6*a* of the windshield wiper 6 is inserted.

Therefore, parts for supporting the windshield wiper 6, such as the wiper bracket 16, can be eliminated.

Decrease in number of parts will reduce weight and manufacturing cost.

Furthermore, the extension cowl top member 44 is formed integrally with the base wall 43*c* to extend frontward.

Therefore, the number of parts can be further reduced, contributing to manufacturing cost saving.

The preferred embodiments described herein are illustrative and not restrictive, and the invention may be practiced or embodied in other ways without departing from the sprit or essential character thereof. The scope of the invention being indicated by the claims, and all variations which come within the meaning of claims are intended to be embraced herein.

The present disclosure relates to subject matter contained in Japanese Patent Application No. 2002-077863, filed on Mar. 20, 2002, the disclosure of which is expressly incorporated herein by reference in its entirety.

What is claimed is:

1. A cowl structure for a vehicle, comprising:

a box-section cross member under a windshield of the vehicle;

a dash panel member connected to the cross member;

an extension member extending frontward from a base wall of the cross member; and a wiper bracket attached to a front wall of the cross member and the extension member, wherein a rigidity changing part is provided on the extension member between a point where the wiper bracket is attached to the extension member and the base wall of the cross member, and wherein the dash panel member is connected to the cross member in the rear of the rigidity changing part.

2. The cowl structure according to claim 1, wherein the front wall of the cross member is formed to have, at its lower end, a flange extending frontward, connected to a front edge portion of the base wall of the cross member, and the extension member is connected to the cross member, with its rear end either attached to a top face of the flange of the front wall of the cross member or to a bottom face of the front edge portion of the base wall thereof.

3. The cowl structure according to claim 2, wherein the extension member is formed to have, at its rear end, either an upward step portion with its bottom face attached to the top face of the flange of the front wall of the cross member, or a downward step portion with its top face attached to the bottom face of the front edge portion of the base wall thereof.

4. The cowl structure according to claim 1, wherein the extension member is formed integrally with the base wall of the cross member, and wherein the rigidity changing part is provided on the extension member between a first joint point where the front wall of the cross member is joined to the extension member and a second joint point where the wiper bracket is joined to the extension member.

5. The cowl structure according to claim 4, wherein the rigidity changing part comprises a transversely extending channel.

6. A cowl structure for vehicle, comprising:

a box-section cross member under a windshield of the vehicle, an extension member extending frontward from a base wall of the cross member; and a wiper bracket attached to a front wall of the cross member and the extension member, wherein a rigidity changing part is provided on the wiper bracket.

* * * * *